United States Patent [19]
Walter

[11] Patent Number: 5,931,758
[45] Date of Patent: Aug. 3, 1999

[54] SIMPLIFIED MULTI-RANGE HYDROMECHANICAL TRANSMISSION FOR VEHICLES

[75] Inventor: Glenn Bayne Walter, Pittsfield, Mass.

[73] Assignee: General Dynamics Land Systems, Inc., Sterling Heights, Mich.

[21] Appl. No.: 09/056,929

[22] Filed: Apr. 8, 1998

[51] Int. Cl.[6] .................................................. F16H 47/04
[52] U.S. Cl. ................................ 475/72; 475/78; 475/80
[58] Field of Search ................................ 475/31, 72, 78, 475/80, 81

[56] References Cited

U.S. PATENT DOCUMENTS

| | | | |
|---|---|---|---|
| 3,596,535 | 8/1971 | Polak . | |
| 3,777,593 | 12/1973 | Mooney, Jr. et al. | 475/81 |
| 4,134,311 | 1/1979 | Orshansky, Jr. et al. | 475/81 |
| 4,306,467 | 12/1981 | Pollman | 475/81 |
| 4,754,664 | 7/1988 | Dick | 475/81 |
| 5,113,723 | 5/1992 | Ishino et al. | 475/72 X |
| 5,423,183 | 6/1995 | Folsom | 60/488 |
| 5,730,678 | 3/1998 | Larkin | 475/81 |
| 5,830,097 | 11/1998 | Larkin | 475/72 |

FOREIGN PATENT DOCUMENTS 0 003 397   8/1979   European Pat. Off. .

OTHER PUBLICATIONS

U.S. application No. 08/608,389.
U.S. application No. 08/857,501.

*Primary Examiner*—Charles A Marmor
*Assistant Examiner*—Sherry Lynn Estremsky
*Attorney, Agent, or Firm*—Finnegan, Henderson, Farabow, Garrett & Dunner

[57] ABSTRACT

A hydromechanical transmission receives split power inputs from a vehicle engine, one split input driving a hydrostatic power unit and the other split input driving a mechanical power input. The infinitely variable hydrostatic power output is combined in the mechanical power unit with multiple ratios of its split input power to achieve infinitely variable ratios of hydromechanical output power for smoothly propelling a vehicle from rest through multiple transmission ranges to maximum speed, with synchronous shifting between ranges.

11 Claims, 7 Drawing Sheets

| RANGE | B1 | B2 | CL1 | CL2 | CL3 | HSU STROKE | OUTPUT SPEED |
|---|---|---|---|---|---|---|---|
| FIRST |  | X |  |  |  | 0% → 100% | 0 → 0.333 Ne |
| SECOND |  |  | X |  |  | 0% ← 100% | 0.333 Ne → 0.666 Ne |
| THIRD |  |  |  |  | X | 0% → 100% | 0.666 Ne → 1.0 Ne |
| FOURTH |  |  |  | X |  | 0% ← 100% | 1.0 Ne → 1.33 Ne |
| REVERSE | X |  |  |  |  | 0% → 100% | 0 → 0.333 Ne |

FIG. 3

| RANGE | B1 | B2 | CL1 | CL2 | CL3 | HSU STROKE | OUTPUT SPEED |
|---|---|---|---|---|---|---|---|
| FIRST | X |  |  |  |  | 0% → 100% | 0 → 0.333 Ne |
| SECOND |  |  | X |  |  | 0% ← 100% | 0.333 Ne → 0.666 Ne |
| THIRD |  |  |  | X |  | 0% → 100% | 0.666 Ne → 1.0 Ne |
| FOURTH |  |  |  |  | X | 0% ← 100% | 1.0 Ne → 1.33 Ne |
| REVERSE |  | X |  |  |  | 0% → 100% | 0 → 0.333 Ne |

FIG. 5

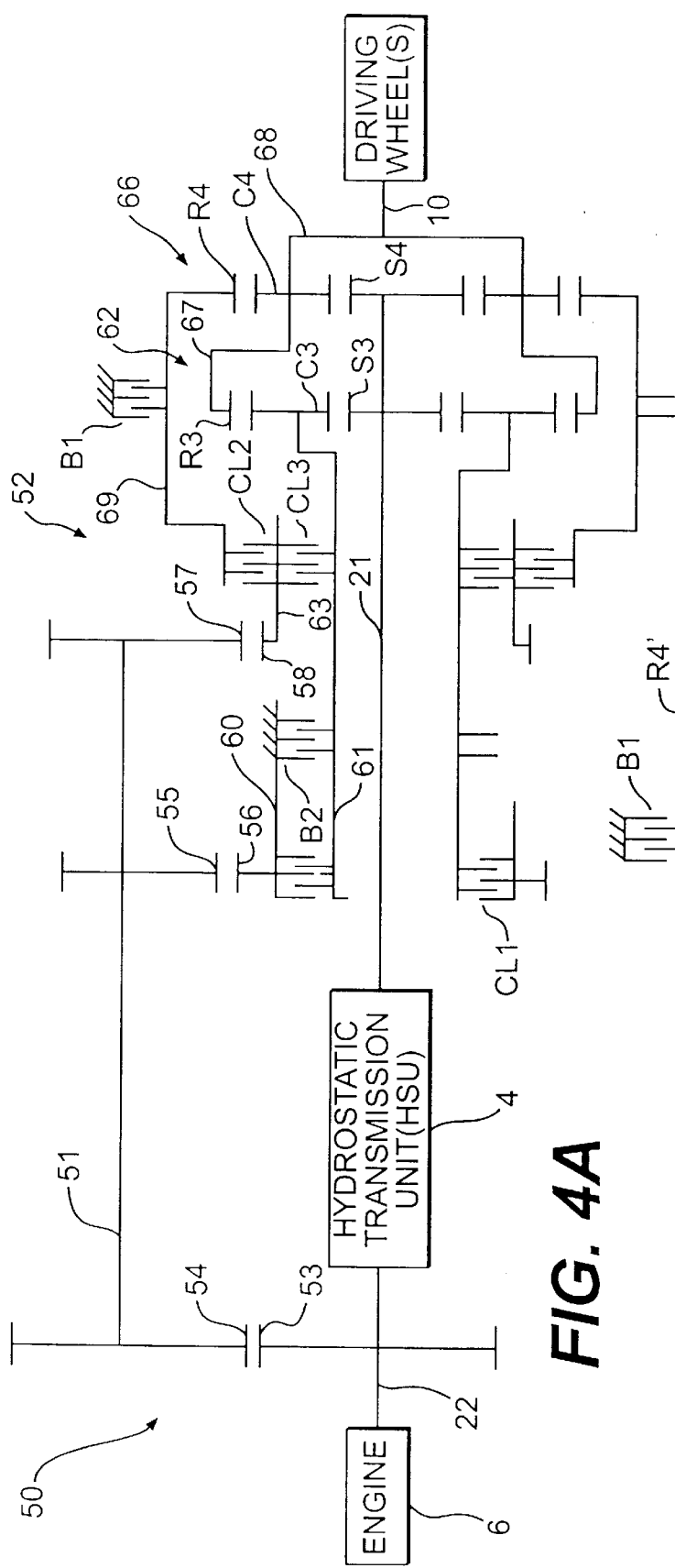
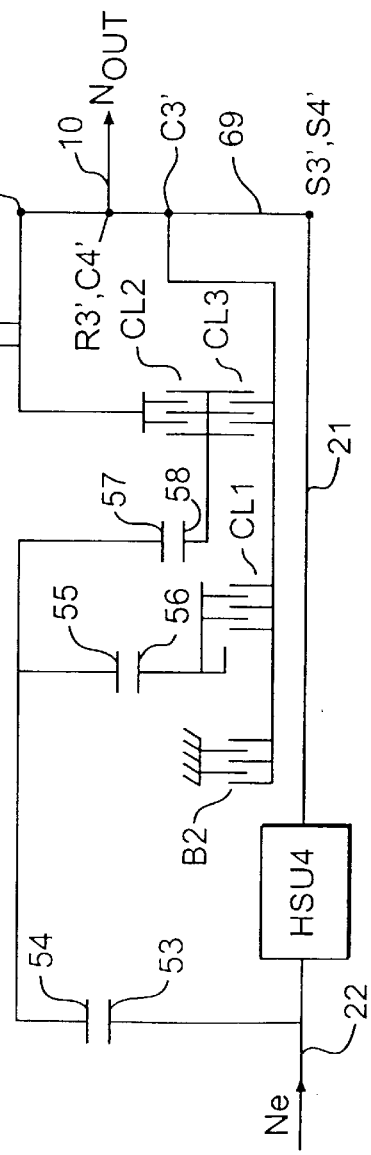
FIG. 4A
FIG. 4B

SIMPLIFIED MULTI-RANGE HYDROMECHANICAL TRANSMISSION FOR VEHICLES

REFERENCE TO RELATED APPLICATION

This application is related to commonly assigned, copending applications Ser. No. 08/857,501, filed May 16, 1997, and Ser. No. 08/608,389, filed Feb. 28, 1996. The disclosures of these related applications are incorporated herein by reference.

FIELD OF THE INVENTION

The present invention relates to hydromechanical transmissions and particularly to multi-range hydromechanical transmissions applicable for inclusion in drivetrains for vehicles.

BACKGROUND OF THE INVENTION

Innumerable designs of transmissions for cars and light commercial vehicles have been proposed over the years that utilize hydraulic transmissions for multiplying engine torque to accelerate a vehicle from rest and then restore or preferably increase output speed potential. However, such design efforts have typically resulted in hydraulic transmissions that, although of acceptable torque capacity, are undesirably large and heavy. Moreover, such transmissions have exhibited less than optimum efficiency, and thus fuel economy and/or performance suffer.

As an alternative to the purely hydraulic transmissions referred to above, hydromechanical transmissions have been utilized in drivetrains for large off-road construction and military vehicles. Such transmissions are typically of a split power input type, wherein a hydrostatic power unit and a mechanical power unit are driven in parallel by the vehicle engine. The hydrostatic power unit converts its split mechanical input power from the engine into hydrostatic output power that can be infinitely varied in speed and torque over a particular hydrostatic stroke range. This hydrostatic output power is combined in the mechanical power unit with its split mechanical input power from the engine to produce hydromechanical output power in multiple power ranges. The speed and torque in each of the power ranges, initially set by gear ratios of the mechanical power unit, can be infinitely varied by varying the stroke of the hydrostatic power unit.

A properly designed hydromechanical transmission can advantageously provide synchronous range shifting that affords smooth and uninterrupted power flow from engine to driving wheel(s), as the vehicle is accelerated from rest to maximum speed. An additional benefit is that the engine may be operated at or near its peak efficiency output speed, regardless of transmission output speed. However, to achieve the performance required of automobiles in terms of acceleration, speed and fuel economy, the mechanical power unit has traditionally required far too many geartrains, such as spur and pinion gear sets and planetary gear sets. Such mechanical transmissions suffer the same drawbacks as their counterpart hydraulic transmissions in terms of size, weight, efficiency, cost, etc.

SUMMARY OF THE INVENTION

It is accordingly an objective of the present invention to substantially obviate one or more of the limitations and disadvantages of prior art vehicular transmissions. To this end and in accordance with the purpose of present invention, as embodied and broadly described, the present invention provides a multi-range hydromechanical transmission comprising, in combination, a transmission controller for receiving operator speed commands; a hydrostatic power unit having a first mechanical input for driving connection to a prime mover and a unidirectional hydrostatic output, the hydrostatic power unit being operatively connected for control by the transmission controller to provide an infinitely variable transmission ratio between a speed of the first mechanical input and a speed of the hydrostatic output over a continuous range of at least 1:0 to 1:1.

The transmission further comprises a mechanical power unit having a second mechanical input for driving connection to the prime mover and a transmission output for connection to a driving wheel of a vehicle. The mechanical power unit includes a combining gear mechanism including first and second interconnected planetary gear sets having a first gear element connected to the hydrostatic output, a second gear element connectable to the second mechanical input at a first gear ratio, a third gear element connectable to the second mechanical input at a second gear ratio, and a fourth gear element connected as the transmission output. The mechanical power unit further includes range shifting means actuated by the transmission controller in response to operator input speed commands for braking and/or clutching selected gear elements of the first and second planetary gear sets to produce an infinitely variable output speed at the transmission output within each of at least one reverse range and at least first, second, and third forward ranges.

Additional objectives and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate a presently preferred embodiment of the invention and together with the description, serve to explain the principles of the invention.

FIG. 3 is a table indicating which of the multiple brakes and clutches in the transmission embodiment of FIG. 1A are engaged in each of the transmission ranges, together with exemplary operating parameters for each transmission range;

FIG. 4A is a schematic diagram of a hydromechanical transmission structured in accordance with a second embodiment;

FIG. 4B is a schematic diagram of the hydromechanical transmission of FIG. 4A with the two planetary gear sets of a combining gear mechanism represented in Lever Analogy diagram form;

FIG. 5 is a table indicating which of the multiple brakes and clutches in the transmission embodiment of FIG. 4A are engaged in each of the transmission ranges and exemplary operating parameters in each range;

Like reference numerals refer to like parts throughout the several views of the drawings.

DETAILED DESCRIPTION OF THE PREFERRED EMBODIMENTS

A multi-range hydromechanical transmission in accordance with the present invention includes a split input for dividing the power output of a prime mover between a hydrostatic power unit and a mechanical power unit. The hydrostatic power unit is operable to convert split input power to hydrostatic output power over a continuously variable speed ratio ranging from 1:0 to at least 1:1. The mechanical power unit combines split input power with the hydrostatic output power from the hydrostatic power unit to provide hydromechanical output power for application to a load, such as one or more driving wheels of a vehicle.

Further, the mechanical power unit of the invention is capable of shifting the split input power between multiple power flow paths that include unique mechanical gearing combinations for a corresponding multiple of mechanical power outputs at different ratios of torque and speed. The mechanical power unit then individually combines each of the mechanical outputs with the hydrostatic power unit output to produce hydromechanical output power at multiple ranges of speed and torque. Within each range, an infinitely variable power ratio is achieved by varying the hydrostatic power unit ratio between 1:0 and at least 1:1.

Figure 1A:
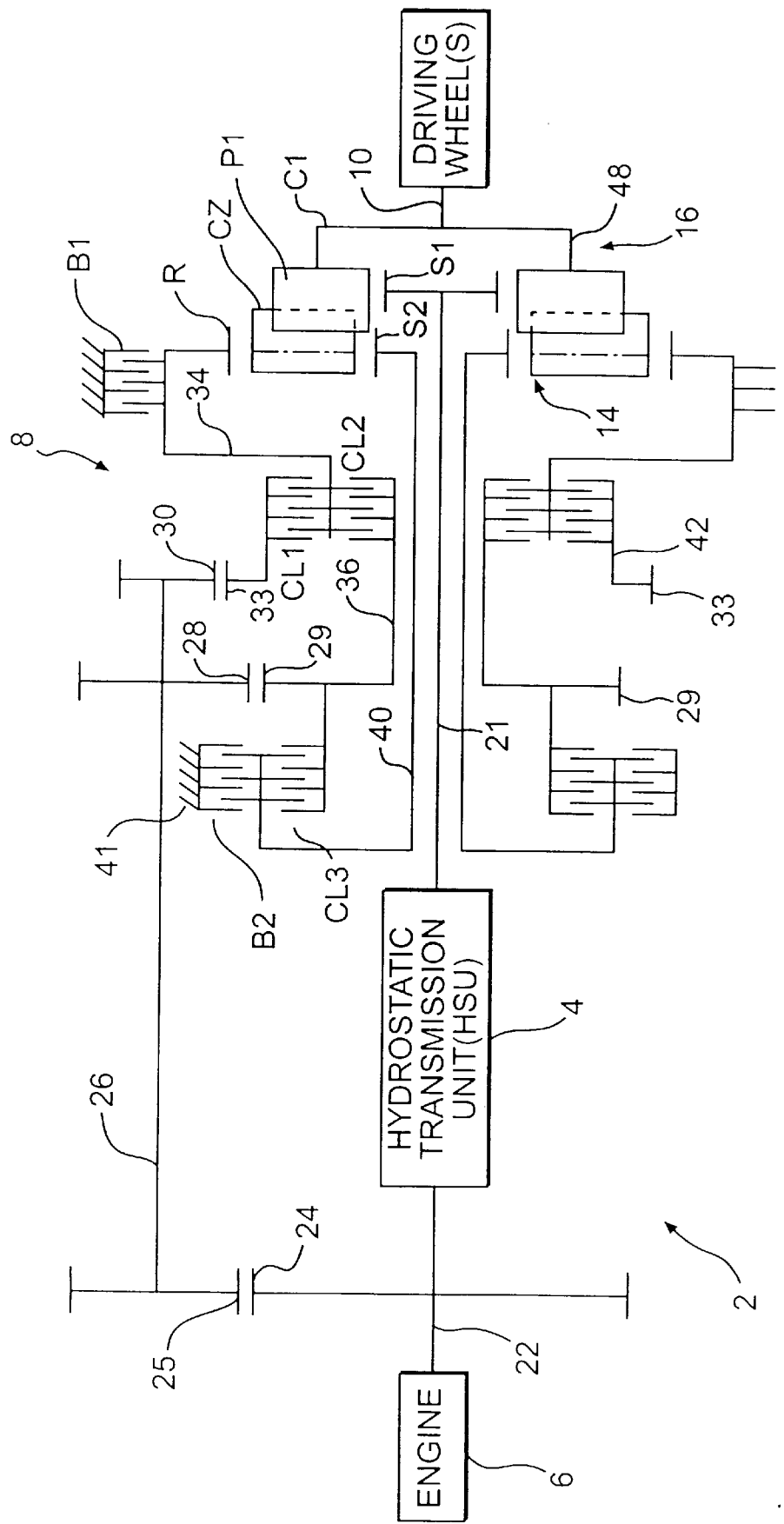
FIG. 1A is a schematic diagram of a hydromechanical transmission structured in accordance with a first embodiment of the present invention.

Turning to the schematic diagram of FIG. 1A, illustrating a first embodiment of the present invention, a multi-range hydromechanical transmission, generally indicated at 2, includes an input shaft 22 for receiving input power from a prime mover, such as a internal combustion engine 6. This input power is split between a hydrostatic power unit (HSU) 4 and a countershaft 26, included in a mechanical power unit, generally indicated at 8. As illustrated by way of example in FIG. 1A, hydrostatic power unit 4 receives its split input from engine 6 directly from input shaft 22, while mechanical power unit 8 receives its split input via a spur gear 24 driven by input shaft 22, which meshes with a spur gear 25 fixed on the left end of countershaft 26. Driven off this countershaft are two spur gears 28 and 30. Spur gear 28 meshes with a spur gear 29 carried by a sleeve shaft 36, which is coupled by a clutch CL2, when engaged, to drive a sleeve shaft 34 connected to ring gear R of a planetary gear set 14. Spur gear 29 is also selectively coupled by a clutch CL3 to a sleeve shaft 40 connected to a sun gear S2 of planetary gear set 14. A brake B2 is provided to connect sleeve shaft 40 to the transmission housing, indicated at 41, and thus brake this sleeve shaft and sun gear S2 against rotary motion. In this case, sun gear S2 is said to be "grounded".

Still referring to FIG. 1A, countershaft spur gear 30 meshes with spur gear 33 carried on a sleeve shaft 42, which is coupled to ring gear R of planetary gear set 14 via clutch CL1 and sleeve shaft 34. Sleeve shaft 34 is also selectively grounded to transmission housing 41 by brake B1.

The infinitely variable speed hydrostatic output of hydrostatic power unit 4 on output shaft 21 is applied to a sun gear S1 of a planetary gear set 16, which, with planetary gear set 14, serves as a combining gear mechanism, i.e., combining the hydrostatic input on sun gear S1 of planetary gear set 16 with the various mechanical inputs applied to planetary gear set 14 to produce a transmission output on shaft 10. Completing the description of transmission 2, planet gears P2 and P1 of planetary gear sets 14 and 16 are mounted in intermeshing relation by a compound carrier C, which is connected by a sleeve shaft 48 to output shaft 10. Those skilled in the art will recognize that planetary gear sets 14 and 16 are arranged in a "Ravigneau" configuration. By virtue of the intermeshing planet gears P1 and P2, the two planetary gear sets utilize a single ring gear R.

As will be seen from the description to follow, the split power input of engine 6, ratioed by spur gears 24, 25, is tapped from the countershaft 26 at various magnitudes of speed and torque determined by the ratios of the meshing spur gear sets 28, 29 and 30, 33 to establish four forward ranges and one reverse range of operation for transmission 2, depending upon selective engagements of the various brakes and clutches. While second through fourth ranges are hydromechanical ranges, first forward range is purely a hydrostatic range, and thus transmission output power is supplied solely by HSU 4 at infinitely variable torque and speed. Within each of the three higher forward speed ranges, the infinitely variable hydrostatic output power supplied by hydrostatic power unit 4 is combined with the mechanical input power tapped from countershaft 26 to achieve infinitely variable output power (speed and torque) in each of the second through fourth ranges. As will be seen, transmission 2 also has the capability of operating in an infinitely variable speed reverse range comparable in power to the first forward range, with input power supplied solely by HSU 4.

Figure 1B:
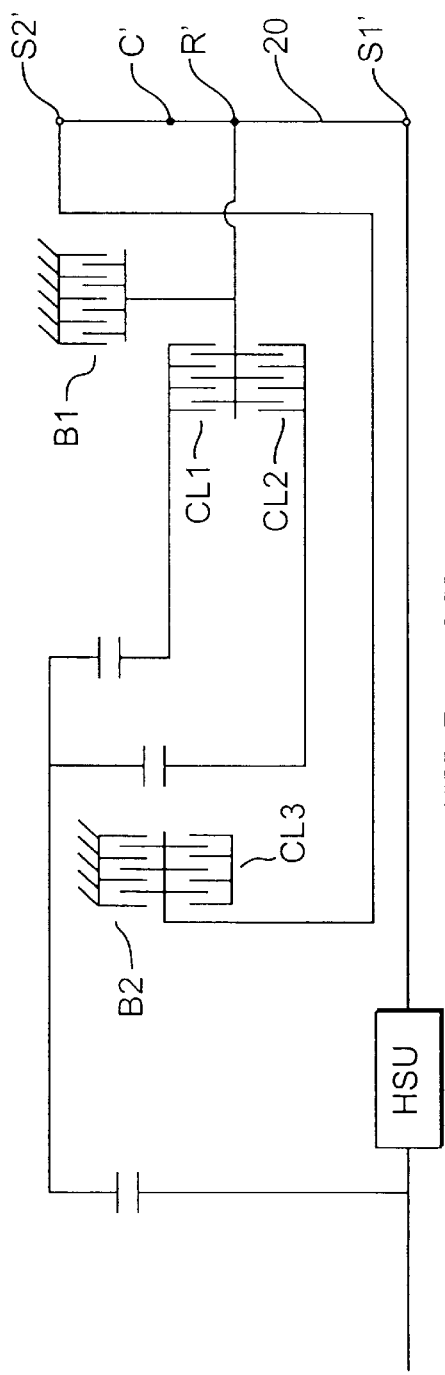
FIG. 1B is a schematic diagram of the hydromechanical transmission of FIG. 1A with the two planetary gears of a combining gear mechanism represented in Lever Analogy diagram form.

To facilitate an explanation of the operation of transmission 2, the following description takes advantage of the analysis technique described in the article "Lever Analogy—A New Tool In Transmission Analysis," by Benford et al., Society of Automotive Engineers, Pub. No. 810102 (1981). According to this technique, a planetary gear set, at rest, can be analogized by a vertical line (lever), with its sun gear, ring gear, and planetary gear carrier represented as points on this line; these points being relatively positioned in accordance with the numbers of sun gear and ring gear teeth, i.e., gear ratio. The speeds of the sun gear, ring gear, and planet gear carrier may be represented as horizontal lines (vectors) originating at their representation points on the vertical line. FIG. 1B is a schematic diagram of transmission 2 identical to FIG. 1A, except the planetary gear sets 14 and 16 are represented in Lever Analogy. By virtue of the "Ravigneau arrangement" of planetary gear sets 14 and 16, the Lever Analogy analysis technique permits the graphical representation of these two planetary gear sets to be reduced to a single lever 20.

From the table seen in FIG. 3, brake B2 is the only one of the various brakes and clutches that is engaged to shift transmission 2 into the first forward range. From FIG. 1A, it is seen that actuation of brake B2 grounds sun gear S2 of planetary gear set 14. Since none of clutches CL1, CL2, CL3 is engaged in first range, the mechanical input on countershaft 26 is decoupled from planetary gear sets 14 and 16.

Thus the only input to mechanical power unit 8 is the hydrostatic output from HSU 4 applied to sun gear S1 via shaft 21.

Figure 2A:
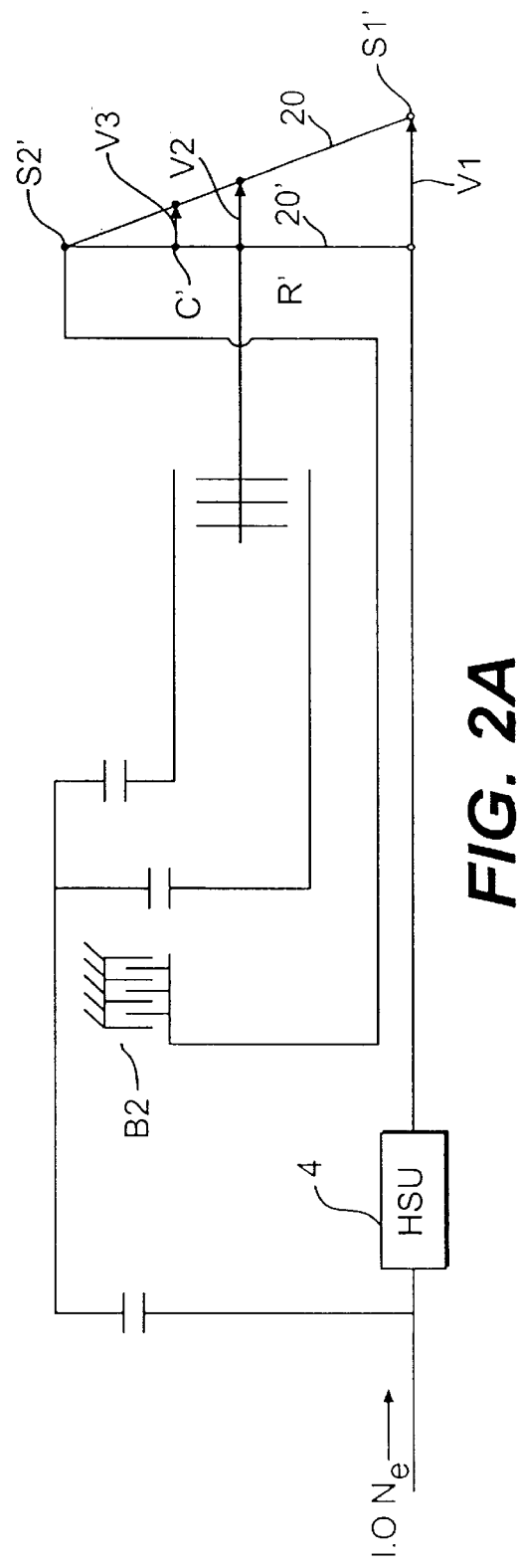
FIGS. 2A–2E are Lever Analogy diagrams providing graphic analyses of the operations of the combining gear mechanism in the transmission embodiment of FIG. 1A in each of the multiple transmission ranges.

FIG. 2A is a graphical representation according to the Lever Analogy of transmission 2 in first range (brake B2 engaged). While hydrostatic power unit 4 is at zero (0%) stroke, i.e., 1:0 ratio (neutral), its hydrostatic output applied to sun gear S1 is zero. Since engaged brake B2 fixes the position of lever point S2 representing sun gear S2, lever 20 can be considered as fixed in a vertical orientation as long as HSU 4 is at zero stroke. It will be appreciated that, when any lever points representing planetary gear elements fall on the vertical axis shown in FIG. 2A–FIG. 2E, their velocities are zero.

It will also be appreciated that a transmission neutral condition (no transmission output regardless of engine input power) can be achieved while HSU 4 is at 0% stroke (1:0 ratio) and thus produces no output power on shaft 21. However, with brake B2 engaged, a "true neutral" in the automotive sense is not achieved since transmission output shaft 10 is not free to rotate. Rather, the neutral condition illustrated by the dashed vertical line 20' in FIG. 2A corresponds to a conventional automotive automatic transmission with the shift selector in a drive position and the engine at idle speed with the vehicle brake applied.

To provide "true neutral" in transmission 2 of the present invention, brake B2 is disengaged. Alternatively, the hydrostatic transmission unit may be depressurized, as disclosed in copending application Ser. No. 08/543,545, such that its output shaft 21 is free to turn, or a disconnect clutch may be installed between engine 6 and transmission input shaft 22 to be disengaged along with brake B2, so as to allow the transmission output shaft to freely turn.

Since brake B2 is engaged during first range operation illustrated in FIG. 2A, the position of the sun gear representation point S2' is fixed. Thus lever 20, representing planetary gear sets 14 and 16, must swing about this point in response to a hydrostatic input on shaft 21 applied to sun gear S1 by stroking HSU unit 4 upwardly from 0% stroke (from 1:0 toward 1:1). This lever swinging motion about the S2' point is from its phantom line position 20' (corresponding to its vertical (zero velocity) solid line position in FIG. 1B) toward its solid line position in FIG. 2A.

It is seen that first forward range is a purely hydrostatic drive range and is infinitely variable in speed ratio in accordance with the stroking of HSU 4. FIG. 2A graphically illustrates in solid line the orientation of lever 20, and vectors V1, V2, and V3 indicate directions and speeds of sun gear S1, ring gear R, and carrier C at maximum stroke (100%) of the hydrostatic power unit upon achieving the upper end of first forward range. At 100% stroke (1:1 speed ratio) of HSU 4, the forward speed of sun gear SI (vector V1) is equal (1.0 Ne) to the speed (Ne) of engine 6. By way of example, the ratios of the gear elements in planetary gear sets may be selected to produce at the upper end of first range a forward speed of 0.5 Ne (vector V2) on ring gear R and a forward speed of 0.333 Ne (vector V3) on carrier C and output shaft 10.

Figure 2B:
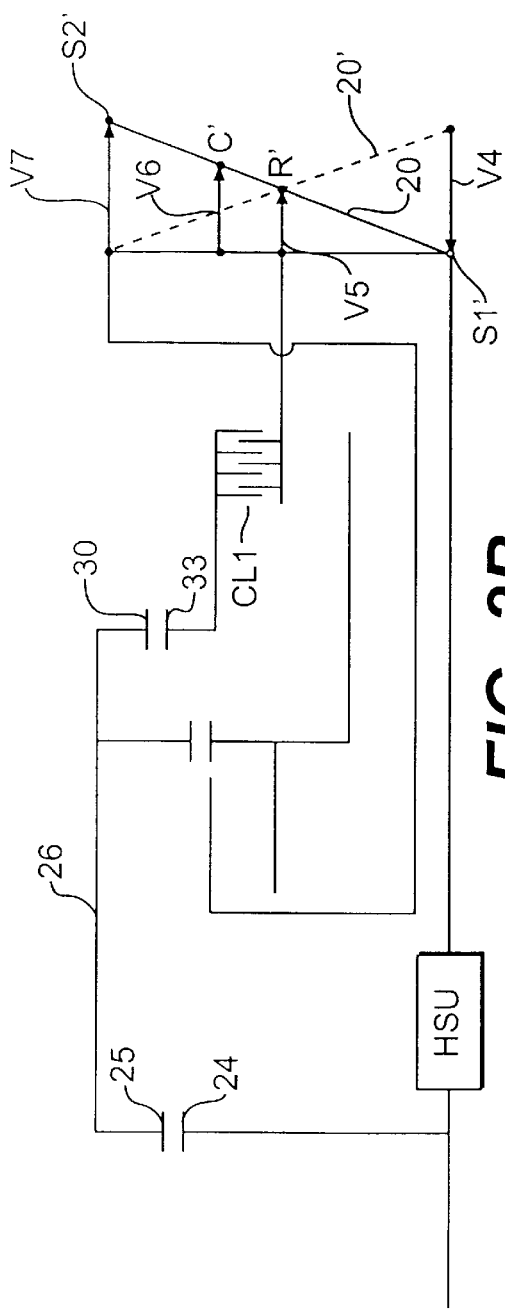

To shift from first forward range to second forward range, brake B2 is disengaged as clutch CL1 is engaged, as seen in FIG. 3. FIG. 2B graphically illustrates, by Lever Analogy, the actions of the planetary gear set elements in response to second range hydrostatic and mechanical input drives. It is seen that, with clutch CL1 engaged, ring gear R is driven at a forward speed determined by the gear-ratioed input power applied thereto from the engine 6 via step-up gears 24, 25 and step-down gears 30, 33. These gear ratios are selected such that the mechanical input applied to ring gear R through clutch CL1 is preferably of a forward speed equal to the forward speed of the ring gear at the top end of a first range, e.g. 0.5 Ne. In such case, synchronous shifting from first to second range can be achieved.

Comparing FIGS. 2A and 2B, it is seen that the orientation of lever 20' in FIG. 2B is the same as its orientation 20 at the top end of first forward range, illustrated in solid line in FIG. 2A. Now, as the hydrostatic power unit 4 is downstroked in speed (vector V4) from its maximum stroke (100%) at the first range-second range shift point toward a minimum stroke (0%) at the top end of second range, lever 20 is pivoted about ring gear point R' (established as a solid pivot point by the mechanical input (vector V5) applied via clutch CL1) in the clockwise direction toward its solid line lever position at the top end of second range (FIG. 2B). As a result, the forward speed (vector V6) of point C' is seen to increase in infinitely variable fashion within second range, e.g., 0.333 Ne →0.666 Ne. As also seen, the forward speed of sun gear S2 increases to 1.0 Ne (vector V7).

Figure 2C:
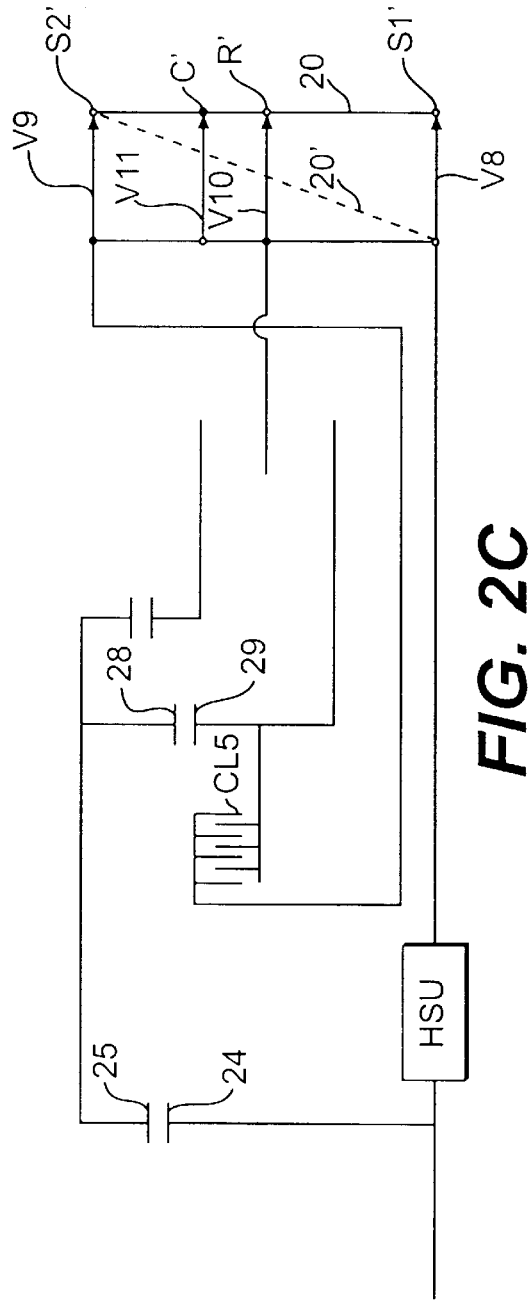

To then shift from second range into third range, clutch CL1 is disengaged as clutch CL3 is engaged (see table of FIG. 3). From FIG. 2C, it is seen that engagement of clutch CL3 couples the mechanical engine input ratioed by gear sets 24, 25 and 28, 29 to sun gear S2. FIG. 2C represents the actions of the planetary gear elements in third range. The phantom line position of lever 20' in FIG. 2C represents its Lever Analogy position at the upper end of the second range (see FIG. 2B). If the ratios of gears 24, 25 and 28, 29 are selected such that ring gear R is driven by the mechanical input coupled via clutch CL3 at a forward speed that is equal to the forward speed of the ring gear at the upper end of second range, e.g., 1.0 Ne, synchronous shifting from second to third range can be achieved. With sun gear S2 now established as a pivot point S2', lever 20 is swung in a counterclockwise direction from its phantom line position toward its solid line position as the hydrostatic input speed (vector V8) on sun gear S1 is increased by upstroking HSU 4 from 0% to 100%, i.e., 0 Ne to 1.0 Ne.

It is seen from FIG. 2C that, at the upper end of third range, the forward speeds of sun gears S1 and S2 (vectors V7 and V8) are equal to engine speed, 1.0 Ne, and thus lever 20 assumes a vertical orientation. The forward speeds of ring gear R (vector V10) and carrier C (vector V11) are also equal to engine speed (1.0 Ne). The forward speed of transmission output shaft 10 at the upper end of third range is equal to engine speed, thus achieving an overall 1:1 transmission ratio.

Figure 2D:
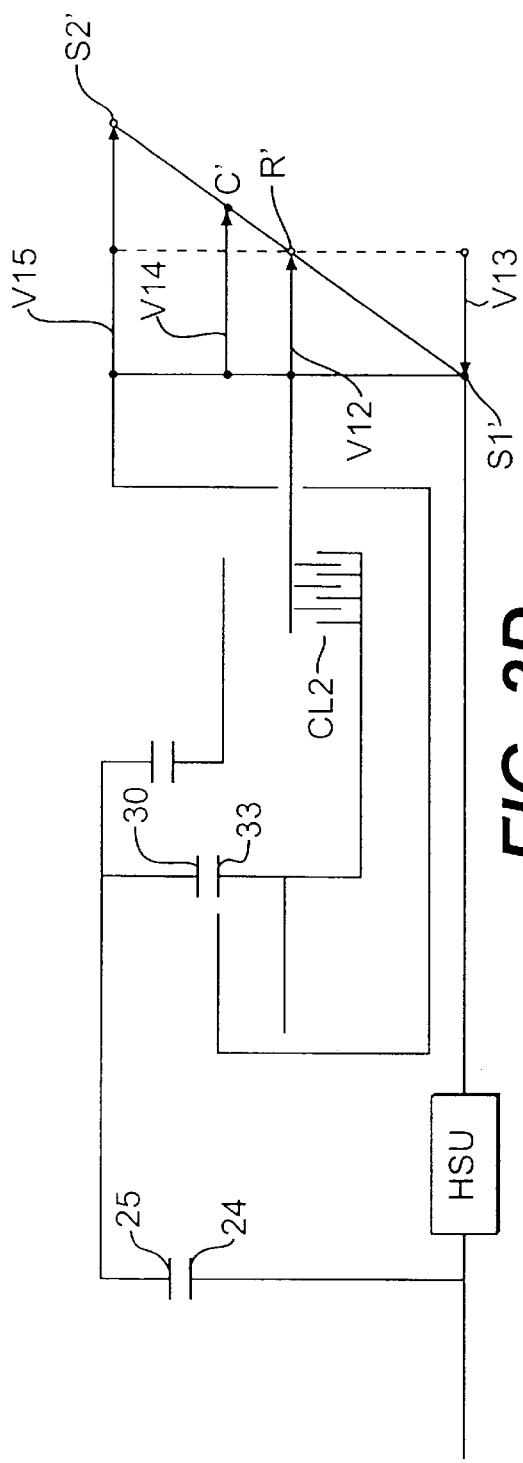

As seen in FIG. 3, shifting from third to fourth range involves disengaging clutch CL3 and engaging clutch CL2. FIG. 2D shows that ring gear R is now driven by the mechanical input of countershaft 26 at engine speed ratioed by the spur gear sets 24–25 and 28–29 (vector V12), which, as described with regard to FIG. 2C, is equal to engine speed (1.0 Ne). Since the forward speed (vector V10) of ring gear R at the upper end of third range is equal to engine speed (1.0 Ne), synchronous shifting from third to fourth range is achieved.

It is seen from FIG. 2D that, as hydrostatic input speed (vector V13) is decreased by downstroking hydrostatic power unit 4, lever 20 is pivoted about ring gear pivot point R' from its phantom line position toward its solid line position, and the forward speed of carrier C increases (vector V14) as does the forward speed of output shaft 10 during acceleration through an overdrive fourth range (1.0 Ne–1.333 Ne). The forward speed of sun gear S2 increases to 2.0 Ne, as indicated by vector V15.

Figure 2E:
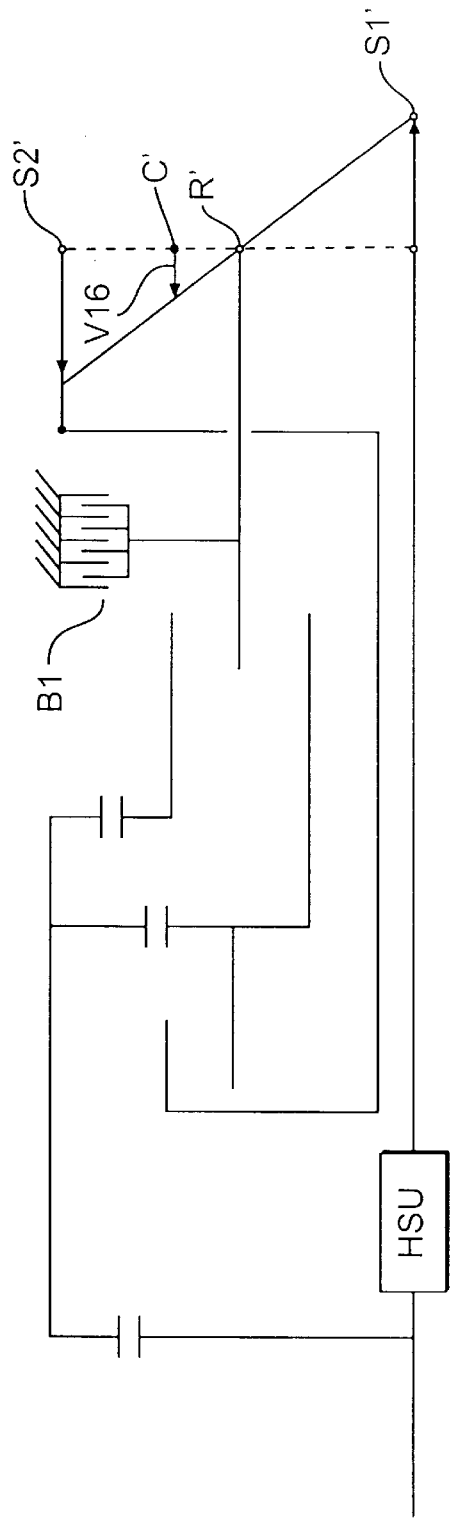

FIG. 2E graphically illustrates operation of the transmission in a reverse range. As illustrated in FIG. 3, shifting into reverse range from a first range neutral condition, imposed by setting a 0% stroke in hydrostatic power unit 4, is achieved by disengaging brake B2 and engaging brake B1. As seen in FIG. 1A, brake B1 grounds ring gear R. Then, as seen from FIGS. 2E and 2A, the phantom line orientation of lever 20 in FIG. 2E corresponds to its orientation in FIG. 2A at first range neutral. Since ring gear R is grounded by brake B1, the ring gear provides a pivot point R' (rather than sun gear pivot point R2' in first forward range) about which lever 20 pivots from its phantom line to its solid line position as HSU 4 is upstroked through reverse range. Since this lever motion is in the counterclockwise direction, it is seen that speed vector V16 of carrier C is now in the left (reverse) direction, which is opposite to the forward vector directions indicated in FIGS. 2B–2D for forward range operations. Thus, output shaft 10 is driven in the reverse direction at infinitely variable speed ratios determined by the stroke setting of HSU 4.

While the forgoing description deals with the progressive increase in output speed from neutral to the multiple forward speed ranges to a maximum transmission output speed, decreasing output speed from maximum to neutral would be accommodated in a reverse manner. That is, rather than upstroking the hydrostatic transmission unit to accelerate through the odd numbered forward ranges and downstroking during the even numbered forward ranges to accelerate from neutral to maximum speed, the hydrostatic transmission would be downstroked during the odd numbered ranges and upstroked during the even numbered ranges to decelerate from maximum speed to neutral. Synchronous shift from range to range during deceleration would be accomplished in the manner described above for acceleration through the ranges.

The foregoing description has focussed on speed ratio aspects of transmission 2 in terms of achieving infinitely variable output speed in all ranges and acceleration through the forward speed ranges from first range neutral to maximum speed at the top end of fourth range. Another equally important aspect of transmission 2 is torque ratio. As is well understood by those skilled in the art, for any given transmission operating point, input power of the engine will equal the output load imposed on the transmission plus losses in the transmission. Engine output power is a function of the product of engine speed and engine torque imposed on the transmission input shaft. Output load is a function of the product of transmission output speed and load torque imposed on the transmission output shaft. By its function, a transmission will alter the values of speed and torque over its multiple ranges. Yet power, the product of speed and torque, is always balanced. As described in the above-cited Benford et al. article, the Lever Analogy technique can also be utilized to determine power balance on each of the planetary gear sets in transmission 2 of FIG. 1. Since one skilled in the art will understand from a study of the Benford et al. paper how to conduct a Lever Analogy analysis for power balance with respect to a multi-range hydromechanical transmission structured in accordance with the present invention, such an analysis here will not be undertaken here for the sake of brevity.

Turning to the embodiment of the invention illustrated in FIG. 4A, a multi-range hydromechanical transmission, generally indicated at 50, includes an input shaft 22 for receiving input power from an engine 6. This input power is split between a hydrostatic power unit (HSU) 4, directly connected to input shaft 22, and a countershaft 51 included in the mechanical power unit, generally indicated at 52. The split power input on countershaft 51 is taken from a spur gear 53, driven by input shaft 22, which meshes with a spur gear 54 fixed on the left end of countershaft 51. This countershaft, in turn, drives two spur gears 55 and 57. Spur gear 55 meshes with a spur gear 56 carried on a sleeve shaft 60, which is selectively coupled to a sleeve shaft 61 by a clutch CL1. This sleeve shaft 61 is directly connected to drive a carrier C3 of a planetary gear set, generally indicated at 62. Spur gear 57 meshes with a spur gear 58 carried on a sleeve shaft 63, which is selectively coupled to sleeve shaft 61 by a clutch CL3. Sleeve shaft 61 is also selectively grounded to the transmission housing by a brake B2. Sleeve shaft 63 is also selectively coupled by a clutch CL2 to a sleeve shaft 64, which is connected to directly drive a ring gear R4 of a second planetary gear set, generally indicated at 66. A brake B1 is provided to selectively ground sleeve shaft 64 to the transmission housing. The hydrostatic output of (HSU) 4 on shaft 21 directly drives a sun gear S3 of planetary gear set 62 and sun gear S4 of planetary gear set 66. Ring gear R3 of planetary gear set 62 is directly connected to carrier C4 of planetary gear set 66 by a sleeve shaft 67, and a sleeve shaft 68 directly connects carrier C4 of planetary gear set 66 to transmission output shaft 10 for driving the wheels of a motor vehicle.

In the same manner as in transmission 2 of FIG. 1A, the split power input of engine 6, ratioed by spur gears 53, 54, is tapped from countershaft 51 at various magnitudes of speed and torque determined by the ratios of meshing spur gear sets 55, 56 and 57, 58 to establish four forward ranges and one reverse range of operation for transmission 50, depending upon selective engagements of the various brakes and clutches. As in the case of transmission 2, the second through fourth ranges of transmission 50 are hydromechanical ranges of infinitely variable speed and torque, while the first forward range is purely a hydrostatic range of infinitely variable speed and torque produced at the output of (HSU) 4. Like transmission 2, transmission 50 also has the capability of operating in an infinitely variable speed reverse range comparable in power to the first forward range, with input power supplied solely by (HSU) 4.

FIG. 4B is a schematic diagram of transmission 50, identical to FIG. 4A, except that planetary gear sets 52 and 62 are represented in Lever Analogy. Since these planetary gear sets are connected in a "Simpson arrangement," the Lever Analogy analysis technique permits the graphical representation of these two planetary gear sets to be reduced to a single lever, indicated at 69.

The table in FIG. 5 illustrates which of the brakes B1 and B2 and clutches CL1–CL3 are engaged to place transmission 50 in each of four forward ranges and one reverse range. For the sake of brevity, Lever Analogy diagrams, such as those provided in FIGS. 2A–2E for transmission 2, will not be repeated here for transmission 50, as one skilled in the art will readily understand the operation of transmission 50 from the following description.

As indicated in the table of FIG. 5, brake B1 is engaged to ground ring gear R4 of planetary gear set 66. This establishes point R4' on lever 69 as a pivot point about which the lever is pivoted in the counterclockwise direction in the manner illustrated in FIG. 2A as (HSU) 4 is stroked upwardly from 1:0 ratio (neutral) toward 1:1 ratio at the upper end of the first forward hydrostatic range. Point R3', C4' is thus advanced forwardly to represent increasing output speed on output shaft 10.

When brake B1 is released and clutch CL1 is engaged to shift into second range, carrier C3 is driven at engine speed ratioed by the gear sets 53, 54 and 55, 56 to establish point C3' on lever 69 as a pivot point. Then, when (HSU) 4 is stroked downwardly from 1:1 ratio to 1:0 ratio, lever 69 is pivoted about pivot point C3' in the clockwise direction to advance point R3', C4' further rightwardly, thus increasing speed on output shaft 10. This operation is directly analogous to the second range operation of transmission 2 illustrated in FIG. 2B.

To shift from second range to third range, clutch CL1 is released and clutch CL2 is engaged, as indicated in the table of FIG. 5, to apply engine speed ratioed by gear sets 53, 54 and 57, 58 to ring gear R4. This again establishes point R4' on lever 69 as a pivot point about which lever 69 is pivoted in the counterclockwise direction as (HSU) 4 is stroked upwardly through third range from 1:0 ratio to 1:1 ratio at the upper end of third range. Pivot point R3', C4' is thus moved further rightward to represent increasing speed on output shaft 10.

To shift from third range to fourth range, the table of FIG. 5 indicates that clutch CL2 is released as clutch CL3 is engaged. As a result, carrier C3 is driven at engine speed ratioed by gear sets 53, 54 and 57, 58 to establish a pivot point about which lever 69 is pivoted in the clockwise direction as (HSU) 4 is stroked downwardly from the 1:1 ratio at the top end of third range to 1:0 ratio at the top end of fourth forward range. As a result, point R3', C4' on lever 69 is advanced further rightwardly to represent increasing speed in the fourth forward range.

Shifting into reverse range from first range neutral, imposed by setting a zero stroke (1:0 ratio in (HSU) 4), is achieved by disengaging brake B1 as brake B2 is engaged. It is seen from FIGS. 4A and 4B that brake B2 grounds the carrier C3 of planetary gear set 62 to establish point C3' on a lever 69 as a pivot point, about which lever 69 is pivoted in the counterclockwise direction as (HSU) 4 is stroked upwardly from 1:0 ratio toward 1:1 ratio. As a result, point R3', C4' on lever 69 is moved in the left (reverse) direction, which is opposite to the R3', C4' point movement during forward range operations. Output shaft 10 is thus driven in the reverse direction in infinitely variable speed ratios determined by the stroke setting of (HSU) 4.

From the foregoing description, it is seen that the pivotal movements of lever 69 of FIG. 4B correspond to the pivotal movements of lever 20 illustrated in the Lever Analogy diagrams of FIGS. 2A–2E in each of the four forward and single reverse ranges. By proper selection of ratio gear sets 53, 54 and 55, 56 and the ratios of planetary gear sets 52 and 62 in transmission 50, the same output speed parameters indicated in the table of FIG. 3 for transmission 2 can be achieved for transmission 50, as is indicated the table of FIG. 5.

Figure 6:
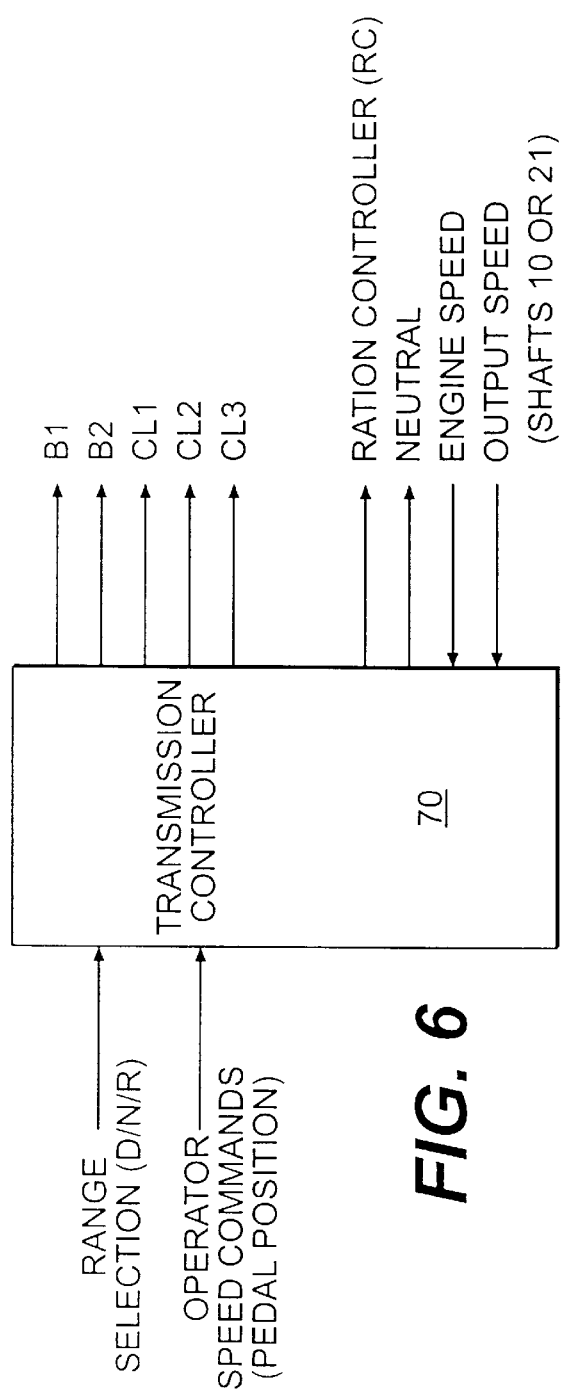
FIG. 6 is a block diagram of a transmission controller that may be utilized to operate the transmission embodiments of FIGS. 1A and 4A through their multiple transmission ranges.

Operation of hydromechanical transmissions 2 and 50 of FIGS. 1A and 4A in their various ranges and synchronous shifting between ranges may be automatically controlled by a transmission controller 70, illustrated in FIG. 6. Transmission controller 70 receives operator speed input commands in terms of accelerator pedal position signals and range selection signals in terms of the position of a shift selection lever being in either of drive (D), neutral (N), or reverse (R) positions. The transmission controller 70 also receives engine speed sensor signals indicating the RPMs of transmission input shaft 22 and output speed sensor signals indicating the RPMs of transmission output shaft 10. In response to these input signals, transmission controller 70 outputs signals to actuate selected ones of the brakes B1, B2 and clutches CL1–CL3. The transmission controller also outputs ratio control signals to a ratio controller, illustrated schematically in FIG. 7 at RC, for controlling the stroking of HSU 4. Such ratio control signals may be in the form of pulse width modulated (PWM) signals, such as disclosed in copending applications, Ser. Nos. 08/380,269 and 08/423,069. As also illustrated in FIG. 6, transmission controller 70 outputs a signal for establishing a "true neutral" condition in hydromechanical transmission 2. A "true neutral" condition is achieved by disengaging brakes B1 and B2 and clutches CL1–CL2. Alternatively, this signal may be used by ratio controller RC in FIG. 7, if this ratio controller and hydrostatic power unit 4 are equipped with the decompression feature disclosed in the above-cited U.S. patent application Ser. No. 08/543,545. Alternatively, this neutral signal may be applied to disengage an input clutch (not shown) included in the drive train between engine 6 and transmission input shaft 22.

While transmission controller 70 may be implemented with analog or fluidic circuitry, digital implementation is preferred. Thus, all of the input signals to the transmission controller 70 are digitized by analog-to-digital converters and then processed by a microprocessor.

Two major functions of transmission controller 70 are to engage the clutches and brakes at the proper times to achieve synchronous range shifting and to effectively match engine power to output load by stroke control of HSU 4. Matching engine power to output power requires a predetermination of engine output power and fuel efficiency at various engine speeds. Having done this, it is possible to determine the optimum engine power/fuel economy operating point at every pedal position (speed command). This relationship, termed "schedule curve", may be stored as an algorithm in a memory associated with the transmission controller microprocessor.

During vehicle operation, the microprocessor continuously compares the operator speed commands to engine speed and adjusts the transmission ratio (hydrostatic power unit stroke) to match the schedule curve. Should the vehicle encounter a grade, output load increases and engine speed decreases. However, if the operator maintains pedal position (constant speed command), transmission controller 70 strokes the hydrostatic power unit to reduce transmission ratio until the schedule curve is again matched. At this point, engine speed and power have recovered, but vehicle speed has decreased. If the operator repositions the accelerator pedal to maintain vehicle speed on the grade, engine speed is increased to match the higher output load. Every engine has a unique, optimum schedule curve that can readily be programmed into the transmission controller microprocessor to adapt transmission 2 to any particular vehicle engine.

Figure 7:
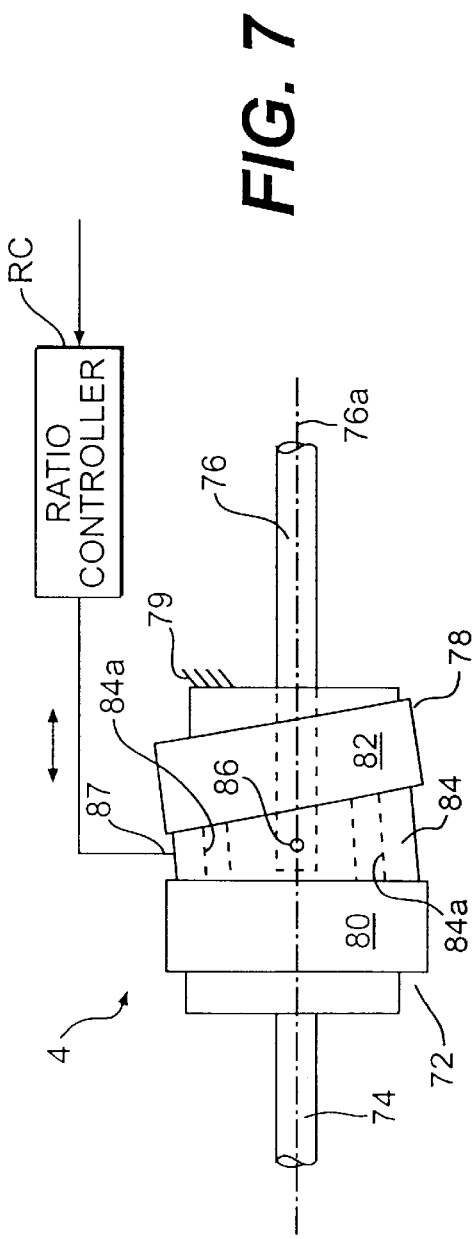
FIG. 7 is a generalized side view of a hydrostatic power unit that may be utilized in the transmission embodiments of FIGS. 1A and 4A.

While a variety of hydrostatic power units may be implemented in the hydromechanical transmission of the present invention, the unique capabilities of a hydrostatic power unit of the type disclosed in Folsom, U.S. Pat. No. 5,423,183 render it particularly suitable for application in the present invention. The complete disclosure of this patent is expressly incorporated by reference herein, and a generalization of this disclosure is illustrated in FIG. 7. As seen in this figure, hydrostatic power unit 4 includes a hydraulic pump unit, generally indicated as 72, driven by an input shaft 74 that may correspond to transmission input shaft 22 in FIGS. 1A and 4A. An output shaft 76, which may correspond to output shaft 21 in FIGS. 1A and 4A, extends through a central opening in a hydraulic motor unit, generally indicated at 78, that is grounded to a unit housing, as indicated at 79. A cylinder block 80 of the driven pump unit 72 and a cylinder block 82 of the grounded motor unit 78 are respectively pivotally mounted so as to assume interfacial contacts with a wedge-shaped swashplate 84 that is torque-coupled to output shaft 76 by a pivotal connection, indicated at 86. As input shaft 74 is driven by engine 6 in FIG. 1A and 4A, pumped exchanges of pressurized hydraulic fluid between the hydraulic pump 72 and motor 78 units through swashplate ports 84a produce a resultant torque on the swashplate 84 that is coupled to the output shaft 76 by coupling 86 as output hydrostatic torque. To change the ratio of input speed on shaft 74 to output speed on shaft 76, ratio controller RC is connected, as indicated at 87, to pivot swashplate 84 about an axis of coupling 86 that intersects the axis 76a of output shaft 76. This angular adjustment of swashplate orientation (angle) strokes hydrostatic power unit 4 to produce a unidirectional, infinitely variable speed hydrostatic output on shaft 76 at ratios ranging from 1:0 (0% stroke) or neutral to at least 1:1 (100% stroke).

The hydrostatic power unit of the type disclosed in U.S. Pat. No. 5,423,183 has a torque multiplying capability at low speed ratios (low stroke settings), which is more than ample torque to accelerate a vehicle from a standing start in the hydrostatic first forward and reverse ranges of transmission 2. Other unique and beneficial characteristics of this type of hydrostatic power unit that lend to application in the hydro-mechanical transmission of the present invention are set forth in the cited Folsom patent.

It is seen from the foregoing description that the present invention provides a continuously variable, multi-range, synchronous shift transmission capable of propelling a motor vehicle in a most efficient manner by changing transmission ratio to precisely match engine power to output load. In fact, engine power may be held at the engine's point of peak operating efficiency as the vehicle is accelerated from rest to maximum speed. Further, the transmission embodiments of the invention offer a smooth, stepless, power flow across the entire operating range without cycling and shock loading to the vehicle drive system. Thus, the present invention affords the capability to precisely match engine power to varying output loads to achieve optimum fuel economy as well as acceleration and overall vehicle performance.

It will be apparent to those skilled in the art that great modifications and great variations could be made in the multi-range hydromechanical transmission of the present invention and in the constructions of the invention embodiments as set forth above without departing from the scope or the spirit of the invention.

Other embodiments of the invention will be apparent to those skilled in the art from consideration of the specification and practice of the invention disclosed herein. It is intended that the specification and examples be considered as exemplary only, but the true scope and spirit of the invention being indicated by the following claim.

What is claimed is:

1. A vehicular multi-range hydromechanical transmission comprising, in combination:
    a transmission controller for receiving operator speed commands;
    a hydrostatic power unit having a first mechanical input for driving connection to a prime mover and a unidirectional hydrostatic output, the hydrostatic power unit operatively connected for control by the transmission controller to provide an infinitely variable transmission ratio between a speed of the first mechanical input and a speed of the hydrostatic output over a continuous range of at least 1:0 to 1:1; and
    a mechanical power unit having a second mechanical input for driving connection to the prime mover and a transmission output for connection to a driving wheel of a vehicle, the mechanical power unit including:
        a combining gear mechanism consisting of first and second interconnected planetary gear sets having a first gear element connected to the hydrostatic output, a second gear element connectable to the second mechanical input at a first gear ratio, a third gear element connectable to the second mechanical input at a second gear ratio, and a fourth gear element connected as the transmission output; and
        range shifting means actuated by the transmission controller in response to the operator input speed command for braking and/or clutching selected gear elements of the first and second planetary gear sets to produce an infinitely variable output speed at the transmission output within each of at least first, second, third, and fourth forward ranges.

2. The transmission defined in claim 1, wherein the range-shifting means includes a first brake actuated by the transmission controller to ground the second gear element of the combining gear mechanism, thereby to establish a transmission neutral condition at the transmission output while the transmission ratio of the hydrostatic power unit, set by the transmission controller, is 1:0, and to produce infinitely variable output speed on the transmission output in the first forward range in direct relation to the infinitely variable speed of the hydrostatic output at transmission ratios other than 1:0.

3. The transmission defined in claim 2, wherein the range-shifting means further includes a first clutch actuated by the controller to connect the third gear element of the combining gear mechanism to the second mechanical input at the second gear ratio and thereby produce infinitely variable output speed at the transmission output in the second forward range in reverse relation to the infinitely variable speed of the hydrostatic output.

4. The transmission defined as defined in claim 3, wherein the range-shifting means further includes a second brake actuated by the controller to ground the third gear element of the combining gear mechanism, and thereby produce infinitely variable output speed at the transmission output in a reverse range in direct relation to the infinitely variable speed of the hydrostatic output at transmission ratios other than 1:0.

5. The transmission defined in claim 4, wherein the range-shifting means further includes a second clutch actuated by the controller to connect the second gear element of the combining gear mechanism to the second mechanical input at the first gear ratio and thereby produce infinitely variable output speed at the transmission output in the third forward range in direct relation to the infinitely variable speed of the hydrostatic output.

6. The transmission defined in claim 5, wherein the first and second gear ratios and gear ratios of the first to fourth gear elements have coordinated values to enable the controller to engage and disengage the first brake and first and second clutches in timed relation to input speed of the prime mover and transmission ratio of the hydrostatic power unit, such as to achieve synchronous shifting between the first and second forward ranges and between the second and third forward ranges.

7. The transmission defined in claim 5, wherein the first gear element is a first sun gear, the second gear element is a second sun gear, the third gear element is a ring gear, and the fourth gear element is a carrier for first and second intermeshing planet gear sets, the first and second planetary gear sets connected in a Ravigneau configuration.

8. The transmission defined in claim 5, wherein the range-shifting means further includes a third clutch actuated by the controller to connect the third gear element to the second mechanical input at the first gear ratio and thereby produce an infinitely variable output speed at the transmission output in the fourth forward transmission range in inverse relation to the infinitely variable speed of the hydrostatic input.

9. The transmission defined in claim 5, wherein the first gear element comprises interconnected sun gears, the second gear element is a ring gear, the third gear element is a carrier, and the fourth gear element comprises an interconnected ring gear and carrier, the first and second planetary gear sets connected in a Simpson configuration.

10. The transmission defined in claim 5, wherein the hydrostatic power unit includes:
 an input shaft for driving connection to the first mechanical input;
 an output shaft having an axis and on which the hydrostatic output is produced;
 a hydraulic pump unit driven by the input shaft;
 a stationary hydraulic motor unit;
 a wedge-shaped swashplate operatively positioned to accommodate pumped exchanges of hydraulic fluid between the hydraulic pump and motor units through ports in the swashplate, the swashplate connected in torque-coupled relation with the output shaft and adjustable about a pivot axis, intersecting the output shaft in orthogonal relation, through a continuous range of swashplate angles; and
 a ratio controller operable by the transmission controller to pivot the swashplate through the range of swashplate angles and thereby stroke the hydrostatic power unit through the 1:0 to 1:1 transmission ratio range.

11. A vehicular multi-range hydromechanical transmission comprising, in combination:
 a transmission controller for receiving operator speed commands;
 a hydrostatic power unit having a first mechanical input for driving connection to a prime mover and a unidirectional hydrostatic output, the hydrostatic power unit operatively connected for control by the transmission controller to provide an infinitely variable transmission ratio between a speed of the first mechanical input and a speed of the hydrostatic output over a continuous range of at least 1:0 to 1:1; and
 a mechanical power unit having a second mechanical input for driving connection to the prime mover and a transmission output for connection to a driving wheel of a vehicle, the mechanical power unit including:
  a combining gear mechanism consisting essentially of first and second interconnected planetary gear sets having a first gear element connected to the hydrostatic output, a second gear element connectable to the second mechanical input at a first gear ratio, a third gear element connectable to the second mechanical input at a second gear ratio, and a fourth gear element connected as the transmission output; and
  range shifting means actuated by the transmission controller in response to the operator input speed command for braking and/or clutching selected gear elements of the first and second planetary gear sets to produce an infinitely variable output speed at the transmission output within each of at least first and second forward ranges, wherein the range-shifting means includes a first brake actuated by the transmission controller to ground the second gear element of the combining gear mechanism, thereby to establish a transmission neutral condition at the transmission output while the transmission ratio of the hydrostatic power unit, set by the transmission controller, is 1:0, and to produce infinitely variable output speed on the transmission output in the first forward range in direct relation to the infinitely variable speed of the hydrostatic output at transmission ratios other than 1:0, and wherein the range-shifting means further includes a first clutch actuated by the controller to connect the third gear element of the combining gear mechanism to the second mechanical input at the second gear ratio and thereby produce infinitely variable output speed at the transmission output in the second forward range in reverse relation to the infinitely variable speed of the hydrostatic output, and wherein the first and second gear ratios and gear ratios of the first to fourth gear elements have coordinated values to enable the controller to engage and disengage the first brake and first clutch in timed relation to input speed of the prime mover and transmission ratio of the hydrostatic power unit, such as to achieve synchronous shifting between the first and second forward ranges.

\* \* \* \* \*